(12) United States Patent
Waldman et al.

(10) Patent No.: US 8,642,169 B2
(45) Date of Patent: Feb. 4, 2014

(54) DECORATIVE LAYERED PANEL DEVICE AND PROCESS

(76) Inventors: Edward H Waldman, Overland Park, KS (US); Philip D. Gibson, Lenexa, KS (US)

( * ) Notice: Subject to any disclaimer, the term of this patent is extended or adjusted under 35 U.S.C. 154(b) by 51 days.

(21) Appl. No.: 13/197,091

(22) Filed: Aug. 3, 2011

(65) Prior Publication Data

US 2012/0045638 A1 Feb. 23, 2012

Related U.S. Application Data

(60) Provisional application No. 61/374,833, filed on Aug. 18, 2010.

(51) Int. Cl.
*B32B 3/06* (2006.01)
*B32B 7/12* (2006.01)

(52) U.S. Cl.
USPC .............. 428/316.6; 428/305.5; 428/306.6; 428/308.4; 428/317.7; 428/319.3

(58) Field of Classification Search
None
See application file for complete search history.

(56) References Cited

U.S. PATENT DOCUMENTS

| | | | |
|---|---|---|---|
| 3,514,313 A * | 5/1970 | Herrick et al. | 427/246 |
| 4,293,603 A | 10/1981 | Hayman-Chaffey et al. | |
| 4,463,053 A | 7/1984 | Brinegar | |
| 4,875,958 A | 10/1989 | Kurokawa | |
| 5,286,547 A | 2/1994 | Tyerman | |
| 5,480,698 A | 1/1996 | Hayman-Chaffey | |
| 5,525,272 A | 6/1996 | Dugdale | |
| 5,624,524 A | 4/1997 | Gordon | |
| 6,562,163 B1 | 5/2003 | Wellington | |
| 6,863,967 B2 | 3/2005 | Cramer | |
| 2006/0178264 A1* | 8/2006 | Kameshima et al. | 502/439 |
| 2010/0055660 A1* | 3/2010 | Hicks | 434/365 |

* cited by examiner

*Primary Examiner* — Hai Vo
*Assistant Examiner* — Chinessa Adkins
(74) *Attorney, Agent, or Firm* — Intellectual Property Center, LLC; Arthur K. Shaffer

(57) ABSTRACT

The present invention is directed to a new and improved method and process for manufacturing a layered laminate device. Said device including a decorative surface between a carrier and visual surface as well as a backing surface positioned along the carrier surface. Optionally, the method and process may include creating channels associated with at least one of the carrier or visual surfaces, protective coatings associated with one or more of the carrier or visual surfaces, or barriers for receiving the decorative surface.

9 Claims, 2 Drawing Sheets

DECORATIVE LAYERED PANEL DEVICE AND PROCESS

CROSS REFERENCE TO RELATED APPLICATION

This application claims priority under 35 U.S.C. 119(e) and 37 C.F.R. 1.78(a)(4) based upon U.S. Provisional Application, Ser. No. 61/374,833 for A DECORATIVE LAYERED LAMINATE DEVICE AND PROCESS, filed Aug. 18, 2010, the disclosure of which is incorporated herein by reference.

FIELD OF THE INVENTION

The present invention generally relates to a system and process for making decorative layered panels and more particularly the present invention relates to a system and process for coating a paneled material with a visually enhancing composition having a back coat which is at least semi-opaque.

BACKGROUND OF THE INVENTION

It is generally known that materials may be colored or visually enhanced by placing a decorative coating on a number of surfaces adapted for receiving the decorative coating. Some known surfaces include laminates and layered panels including PLEXIGLAS and LUCITE and other layered surfaces like FORMICA. PLEXIGLAS is a registered trademark of Arkema France Corp., LUCITE is a registered trademark of Lucite. International, Inc.

Acrylic sheets are generally commonly available, durable, relatively inexpensive, and may be produced with a variety of characteristics for various applications. However, generally, acrylic sheets have limited decorative tolerances and often require any decoration or colorization to be performed during the manufacture of the sheets. Typically, color may only be applied during the manufacture process where a generally uniform pigment or color is dispersed throughout the acrylic sheet during the pouring of the sheet. Creating decorative laminate layered materials using acrylic sheets has been problematic. In some cases, acrylic sheets have poor pigment adhesion, poor abrasion-resistance and are difficult to color or pattern.

In addition, some decorative laminate materials use a chemical composition to form a colored surface; however, some of these compositions release undesired gasses as a result of the chemical process. Without allowing for the release of these undesired gasses, the gasses can create unsightly distortions and may lead to trapped bubbles formed within the laminate material which in turn may lead to premature separation of the layered materials, causing the layered material to fail.

In addition, some laminate materials utilize transmitted light in providing a visual effect. However, using transmitted light through the laminate material may reduce the utilization of the laminate to a limited number of applications based upon the necessary light and the visual leakage presented by the surrounding environment and the translucent nature of the prior art laminates in which the underlying surface may be depicted. In some cases, underlying structures or other undesired objects may be visible. Some prior art attempts to limit this problem have attempted, to utilize a mounting material such as wood or fiber board to hide the visible structures, however, these attempts again come with their own disadvantages like the requirement to provide a mounting structure, increased cost, weight and thickness. Therefore, it would be advantageous to provide a non-transparent decorative layered laminate structure which overcomes these disadvantages.

Some patent applications discuss prior attempts to address the problem associated with decorating acrylic sheets including U.S. Pat. No. 4,293,603 and U.S. Pat. No. 4,107,235 which are hereby incorporated by reference. However, many of these prior art references have disadvantages or shortcomings which leave an unresolved need addressed by the present invention.

Heretofore, there exists a need for an improved system and process for creating decorative layered laminates which provides for a durable, decorative laminate material which may be layered as desired to address some of the above referenced disadvantages.

SUMMARY OF THE INVENTION

The present invention is directed to a new and improved decorative layered laminate. It discloses a system for creating a laminate layered device including a decorative surface positioned between visual and carrier surfaces as well as a backing surface positioned along the carrier surface. Additionally, and optionally, the system may include a protective coating positioned along one or more of the surfaces, a barrier for receiving the decorative surface, or channels for allowing the passage of fluids along one or more of the carrier or visual surfaces. The method of manufacturing the laminate device may include providing a decorative layered laminated device having the surfaces described infra, removing the protective coating, constructing the barrier, sculpting channels, forming a decorative surface, removing the barrier, and applying the non-transparent backing.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed structure.

Figure 1:
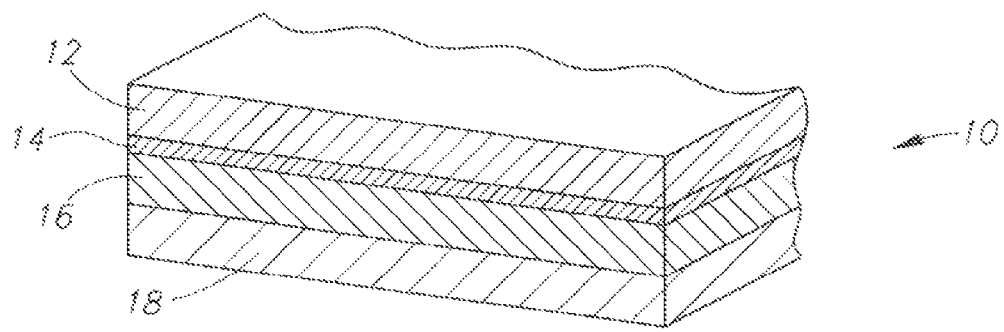
FIG. 1 depicts an exemplary embodiment of the present invention from a top perspective.

FIG. 1 illustrates an exemplary embodiment of the present invention, a decorative layered laminate device, generally referred to as reference numeral 10 which includes a visual surface 12, a decorative surface 14, a carrier surface 16 and a backing 18. The visual surface 12 and the carrier surface 16 may be commercially available acrylic sheets which are adapted for visually presenting the decorative surface 14 positioned therebetween.

Figure 2:
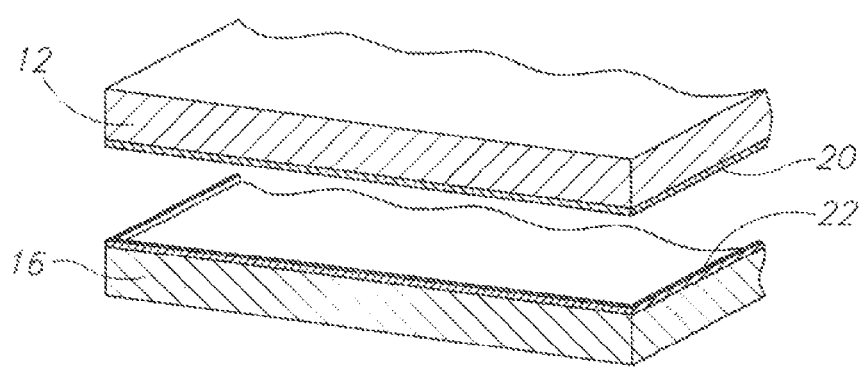
FIG. 2 depicts an exploded top perspective of an exemplary embodiment of the present invention.

The visual and carrier surfaces 12, 16 may optionally include a scratch-resistant coating 20 to protect them from undesired abrasions or scratches as depicted in FIG. 2. A barrier 22 may be constructed along at least one of the carrier or visual surfaces 12, 16. The barrier 22 may be constructed of various materials including organic or inorganic materials such as acrylic, adhesive or some other material. Generally, the barrier 22 forms an elevated surface adapted for receiving the decorative surface 14. In one embodiment, the barrier 22 extends along the perimeter of the visual and carrier surfaces, 12, 16.

Figure 3:
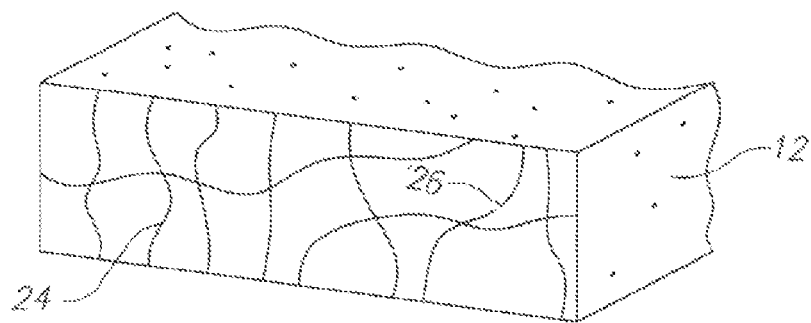
FIG. 3 depicts a visual surface of an exemplary embodiment of the present invention including optional channels.
Figure 4:
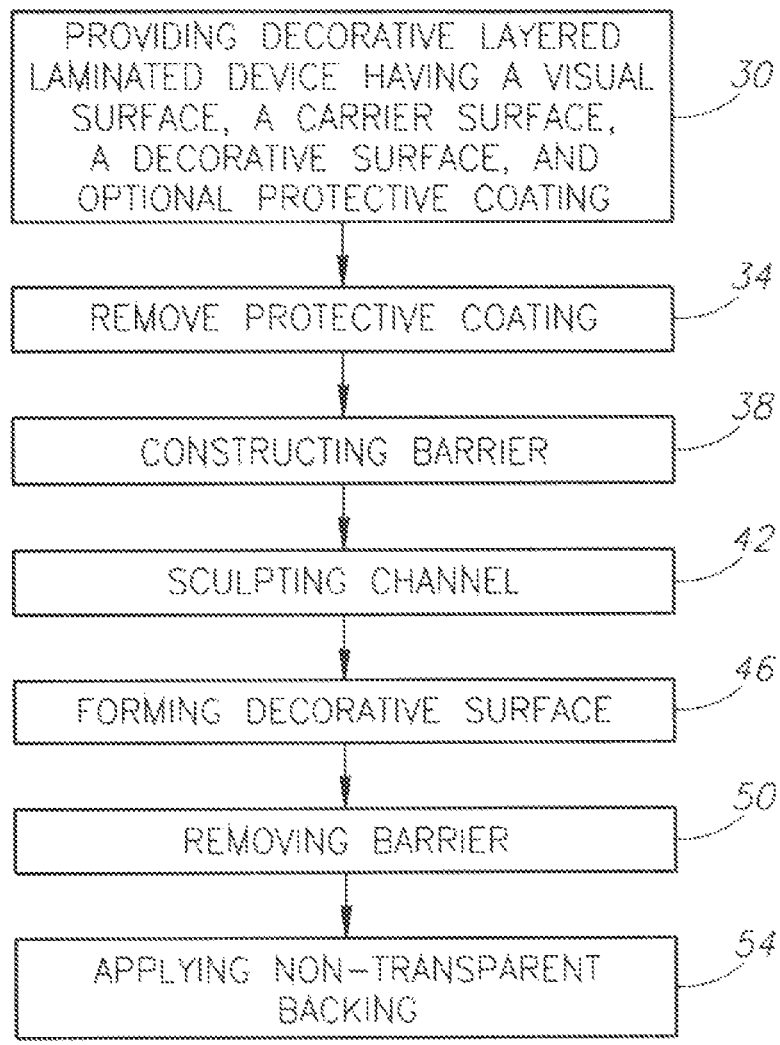
FIG. 4 depicts an exemplary process flow-diagram illustrating the manufacture of the device according to FIG. 1.

A first channel network 24 may be associated with one or both of the visual or carrier surfaces 12, 16 as desired and depicted in FIG. 3. The channels 24 may be formed using manual or machined techniques. Generally, the channels 24 associated with the first channel network extend outwardly from the layered surfaces and allow for passage of at least a portion of any formed gases, bubbles or air pockets along the layered surfaces. In addition, the channels present an elongated receiving structure which presents a visual effect such as veins or other aesthetic indicia along the associated surface. In one embodiment, the channels 24 may be formed using handheld tools along the visual surface 12. Additionally or alternatively, the channels 24 may be formed along the carrier surface 16 using a laser, engraver, CNC machine or a machine such as a handheld rotary tool with a shaped tip including, but not limited to: burs, bits, files, routers, cutters, grinders, and brushes in various sizes and shapes to create, carve or altered the associated surface as desired. A second channel network having a plurality of second channels 26 may be formed using chemical or thermal processes intiated by the layering of the carrier surface 16 upon the visual surface 12, the carrier surface 16, visual surface 12 and first channel network 24 being in communication through the second channel network represented by the plurality of second channels 26, which is superimposed thereupon. In an alternative embodiment, the first and second channel networks 24 26 may present a visual indicia, such as but not limited to a graphic or character, within either one or both of the carrier and visual surfaces 12, 16.

The decorative surface 14 may be formed using a variety of techniques and materials, but in one embodiment, the decorative surface 14 may be formed using a bronzing technique in which a metal powder is applied to the visual surface 12 to present a visual pattern. In an exemplary embodiment, a bronzing powder is applied to the visual surface 12 and is crystallized using an acrylic pressure sensitive adhesive which is generally known. Preferably, the adhesive is of the type used in bonding acrylic plastics and which may cure by evaporation of a solvent with a catalyst. The adhesive is generally a clear liquid which is resistant to oil and water, but can be mixed with pigments or dyes. Optionally, a pigment may be applied to the visual surface 12 in addition to the bronze powder to present an enhanced visual pattern.

The decorative surface 14 may be painted using a colored solution, such as, but not limited to, an acrylic resin dye which is formed from mixing an acrylic solvent with a resin dye. These materials may be mixed in various concentrations, colors and materials to create the desired visual effect. Once the mixture has been painted onto the decorative surface 14, it is then cured and as a mixture of an acrylic resin, wash solution, may be applied or washed over the decorative surface 14 to further enhance the desired visual pattern. A variety of solvents may be utilized as washes, providing a more liquefied appearance.

The decorative surface 14 may be placed on one or both of the carrier surface 16 and the visual surface 12. Once the decorative surface 14 has cured, additional decorative surfaces may be layered or combined impacting the light transmission there through as desired to create structural and/or visual variations. The time for curing may depend on ambient conditions and the specific concentration of the wash solution and the colored solution, but generally takes between 15 minutes to a day. Upon completion of the desired decorative surface 14, the barriers 22 may be removed from the associated surfaces 16, 12.

The carrier and visual surfaces 16, 12 may then be layered together with one or both of the surfaces, 16, 12 being coated with an adhesive material, such as but not limited to an acrylic adhesive, acrylic pressure sensitive adhesive polymer, monomer base adhesive or other appropriate cement or adhesive, with the surfaces 16, 12 being placed in a generally overlying relation with the other surface 16, 12 to enclose the decorative surface 14. Upon layering of the carrier and visual surfaces 16, 14, gasses may form and escape through the elongated channels 24. Mechanical or manual techniques, such as but not limited to rollers, presses or other, generally known, pressure related techniques may be utilized to assist in the removal of any undesired gasses released between the layered surfaces 12, 14, 16. Selective pressing may also be utilized to manipulate the various visual layers and any associated gasses and bubbles related thereto. Solvents, colorants and additional materials may be selectively used to create a channel barrier occluding transport of the gasses through the channelshave.

A backing or backing surface 18 may be applied to carrier surface 16 opposite the decorative surface 14. The backing 18 is generally a coating which limits the transparency of the decorative layered laminate 10 and is adapted for being secured to a structural member as desired. The backing may be a pigment and solvent mixture which can be easily coated over the carrier surface 16, while being adapted for fusing with the layered device 10 such that it forms a relatively non-temporal bond with the device 10 and prepares the device 10 for adhesion with an adhesive material to any desired surrounding structural members.

In an alternative embodiment, the device 10 is formed using a common adhesive material, such as but not limited to, an acrylic adhesive material compatible with joining acrylic materials together. In this exemplary embodiment, the acrylic adhesive material may include, but is not limited to, Acrylic adhesive SC-94 which is commercially available from Caseway Industrial Products, Inc. This acrylic adhesive material may be utilized for forming the decorative surface 14 and for, joining the carrier and visual surfaces 16, 12 as well as fusing the backing 18. In addition, various additives may be utilized in varying concentrations for greater control of various environmental factors including utilizing methyl methacrylate for increasing the drying time and acetal acid may be utilized to decrease the impact caused by ambient humidity.

Various layer thickness and compositions may be utilized in the present invention each with varying characteristics, for example some may be thicker or denser. Some may have additional protective coatings to increase the durability or impact resistance. Some may have UV coatings to reduce the degradation of the layered materials associated with the layered device 10. Depending on the desired application, the present invention may be utilized in interior or exterior windows, doors, or accessories like furniture or counters. In addition, the device 10 may be used as structural members or artwork itself, if desired.

In operation, a method for manufacturing the decorative layered laminate device 10 may include the steps of providing a decorative layered laminate device 10 having a visual surface 12, a carrier surface 16 and a decorative surface 14 positioned therebetween, one of the visual or carrier surfaces having an optional protective coating 10 which is removed 34. Constructing 38 an elevated barrier 22 generally along the perimeter of the carrier and visual surfaces 16, 12, sculpting 42 at least one channel 24 within at least one of the visual and carrier surfaces 12, 16 using manual and/or mechanical and/or thermal and/or chemical methods. Forming 46 the decorative surface 14 using at least one of the following techniques including, but not limited to, bronzing, painting, laying and gluing the decorative surface 14, where the bronzing utilizes a bronzing powder, painting utilizes a pigmented wash solution with a pigment, laying includes associating a graphical indicia with at least one of the layers and gluing includes joining the surfaces in an overlying manner. Removing 50 a barrier 22 associated with one or more of the carrier and visual surfaces 16, 12. Applying 54 a non-transparent backing 18 which may be applied to the device 10; wherein the backing 18 includes a pigment-solvent mixture which prepares the device 10 for adhesion to a structural member.

While the foregoing detailed description along with the attached figures and drawings disclose several embodiments of the invention, it is to be understood that the above description is illustrative only and not limiting of the disclosed invention. It will be appreciated that the discussed embodiments and other unmentioned embodiments may be within the scope of the present invention.

Having thus described the invention, what is claimed as new and desired to be secured by Letters Patent is as follows:

1. A layered decorative panel system comprising:
    a pair of acrylic panels at least one having a visual surface and the other having a carrier surface, a decorative surface positioned therebetween;
    a channel network having a plurality of channels associated with one of said visual or carrier surfaces presenting a visual effect thereat and transporting a portion of gas formed therebetween; and
    one of said channels extending outwardly from said visual or carrier surfaces layered upon each other; and
    a bronzing powder at least partially received by at least one of said channels and selectively crystallized using an acrylic pressure sensitive adhesive.

2. The system according to claim 1 wherein said channel network comprises a first channel network and a second channel network, said first channel network mechanically imposed upon one of said visual and carrier surfaces and said second channel network being superimposed upon a first panel, a second panel and said first channel network by said second panel.

3. The system according to claim 1 further comprising an opaque backing surface applied to said carrier surface opposite said decorative surface.

4. The system according to claim 1 wherein said acrylic pressure sensitive adhesive further comprises methyl methacrylate.

5. The system according to claim 1 wherein said acrylic pressure sensitive adhesive further comprises acetal acid.

6. The system according to claim 1 wherein said acrylic pressure sensitive adhesive further comprises an acrylic solvent and a resin dye, wherein said acrylic pressure sensitive adhesive is at least partially received by at least one of said channels.

7. The system according to claim 1 wherein said decorative surface comprises a plurality of decorative surfaces.

8. The system according to claim 1 further comprising a colored pigment mixture at least partially received by at least one of said channels.

9. A layered decorative panel system comprising:
    a first panel comprising a first visual surface;
    a second panel having a first carrier surface and a second visual surface;
    a backing having a second carrier surface;
    a first decorative surface positioned between said first visual surface and said first carrier surface and a second decorative surface positioned between said second visual surface and said second carrier surface;
    a channel network having a plurality of channels associated with at least one of the said first and second decorative surfaces presenting a visual effect thereat and transporting a portion of gas formed therebetween;
    at least one of said channels extending outwardly, said first and second decorative surfaces layered upon each other; and
    a bronzing powder at least partially received by at least one of said channels and selectively crystallized using an acrylic pressure sensitive adhesive.

* * * * *